United States Patent [19]
Park et al.

[11] Patent Number: 6,163,739
[45] Date of Patent: Dec. 19, 2000

[54] TACTILE FEEDBACK APPARATUS USING ELECTROMAGNETIC ATTRACTION FOR REMOTE CONTROL ROBOT

[75] Inventors: Jong Oh Park, Seoul; In Suk Ahn, Suwon; Jung Hoon Lee, Seoul, all of Rep. of Korea

[73] Assignee: Korea Institute of Science & Tech., Rep. of Korea

[21] Appl. No.: 09/072,515

[22] Filed: May 4, 1998

[30] Foreign Application Priority Data

May 3, 1997 [KR] Rep. of Korea ................... 97-17145

[51] Int. Cl.[7] .................................................. G05B 15/00
[52] U.S. Cl. ..................... 700/245; 700/250; 700/258; 700/262; 700/264; 345/12; 345/13; 345/21; 710/18; 710/19; 710/65
[58] Field of Search ............................. 700/245, 250, 700/254, 257, 258, 262, 264; 345/12, 13, 20, 21; 710/18, 19, 65

[56] References Cited

U.S. PATENT DOCUMENTS

| | | | |
|---|---|---|---|
| 5,825,983 | 10/1998 | Park et al. .............................. | 395/99 |
| 6,016,385 | 1/2000 | Yee et al. ................................. | 395/80 |

OTHER PUBLICATIONS

R. Andrew Russell, *Robot Tactile Sensing*, Department of Electrical and Computer Systems Engineering, Monash University, 1990, pp. 86–98.

Herbert C. Roters, *Electromagnetic Devices*, 1941, pp. 228–292.

Shape Memory Allow Actuator Controller Design for Tactile Displays, 34th IEEE Conference on Decision and Control, New Orleans, Dec. 13–15, 1995, Robert D. Howe et al, 5 pages.

Optacon II System, A Portable and Versatile Reading Device, http://www.telesensory.com/bpd/optacon.htm—internet document, 2 pages.

Tactile Feedback for Teleoperation, Michael B. Cohn et al, SPIE, vol. 1833 Telemanipulator Technology (1992) pp. 240–254.

Dynamic Contact Mechanics of the Human Fingerpad, Part I: Lumped Response, Dianne T.V. Pawluk and Robert D. Howe, Harvard University, Div. of Engineering and Applied Sciences, Dec. 1996, pp. 1–27.

*Primary Examiner*—Thomas C. Lee
*Assistant Examiner*—Thuan Du
*Attorney, Agent, or Firm*—Ostrolenk, Faber, Gerb & Soffen, LLP

[57] ABSTRACT

A tactile feedback apparatus using an electromagnetic attraction for a remote control robot employs tactile data obtained during operation between a gripper attached to a robot arm of an externally controlled robot and the gripper's target so as to be transferred to an operator stationed in a central control room, thereby enabling the robot system to effectively carry out sophisticated tasks. The tactile feedback apparatus enables a successive tactile control by use of an electromagnetic attraction, and an array type fabrication, and by optimizing a production design to broaden a tactile feedback area, there may be provided a small tactile feedback device for representing a relatively improved tactility per unit, and further by aligning the tactile feedback devices in a 5×5 array mode on a skin of 15×15 $mm^2$, there is obtained a contact location thereof.

5 Claims, 7 Drawing Sheets

TACTILE FEEDBACK APPARATUS USING ELECTROMAGNETIC ATTRACTION FOR REMOTE CONTROL ROBOT

BACKGROUND OF THE INVENTION

1. Field of the Invention

The present invention relates to a tactile feedback apparatus applicable to a remote control robot system, and more particularly to an improved tactile feedback apparatus using electromagnetic attraction for a remote control robot, wherein tactile data obtained during operations between grippers attached to a robot arm of an externally controlled robot and the grippers' targets are effectively transferred to an operator stationed in a central control room, thereby enabling the robot system to effectively carry out a variety of sophisticated tasks.

2. Description of the Prior Art

An industrial robot directly controlled by a human operator stationed at a distance therefrom performs highly complicated tasks, while positively coping with variable external environments. Thanks to its excellent workability, such a remote control robot is widely applied to industrial fields throughout most industrialized nations in the world where environmental obstacles do not allow an easy access for men thereto, and it carries out such objectives as: radioactive material handling tasks in an atomic reactor; deep sea probes, exploitations and experiments under high water pressure; repair work of a satellite breakdown in outer space; and remote medical treatment.

As shown in FIG. 1, a general remote control robot system is operated under the provision of optical and auditory data from its ambience. Recently, in order to provide for more efficient control of the robot, additional tactile application is carried out with regard to its arms and hands. However, owing to deficiency in tactile information applied thereto, the performance of sophisticated tasks by robot still experiences obstacles.

Referring to conventional tactile feedback apparatus applicable to a remote control robot system, there are known the "Teletact II" system of ARRC/Airmuscle Ltd. in Britain and the "Tactools XTT1" system of Xtensory Company in America.

The Teletact II system is operated through the use of air pressure, and a proportionally expandable small air bag is attached thereto. An electronic controller and a compressor are employed to deliver pressure. Each tactor is 15 mm in diameter, and when fully swollen, its contact area becomes 100 mm$^2$. One tactor can be attached to each of the operator's finger knuckles. The maximum output per tactor becomes approximately 8.4 gf/mm$^2$.

The Tactools XTT1 system employs a shape memory alloy, wherein its composition adapts an on/off switching state so that a successive control of its output is not possible. Each tactor measures 9×20×5 mm$^3$, and accordingly only one tactor can be mounted on each finger. An output is produced on the skin of the uppermost knuckle of each finger by one 1 mm diameter pin is attached on each tactor.

However, in order to carry out such a sophisticated remote control, a tactile feedback apparatus required in a practical remote control robot system should satisfy the following conditions.

First, the respective devices provided in the tactile feedback apparatus should be distributed in an array. That is, in order to practically similate the tactility of human, a tactile feedback device should be densely populated in a maximal vicinity to a spatial resolution of 2 mm that denotes a minimal distance difference, by which two kinds of force can be distinguishable when operated with each other spaced by a distance in the simulated skin.

Secondly, in order to provide the operator sensations of a contact or a material slippage, there should be appropriately carried out an array unit feedback control between respective tactile feedback devices.

Thirdly, human force resolution (or sensitivity) is expressed as 2 gf(gram force) and provided with a discontinuous recognition, so that the tactile feedback apparatus enables its force to be under a linear control by a force resolution unit.

Fourthly, side effects that may occur due to the attachment of the tactile feedback apparatus should be overcome or minimized. A product employing an air pressure may generate noise, whereas a vibration-transmitting product may cause weariness when the operator is mounted with the products for a long time. Therefore, such side effects should be corrected, and operational errors and interference caused by the mounting also should be overcome.

However, a tactile feedback apparatus satisfying the above-described requirements has yet to be developed.

SUMMARY OF THE INVENTION

Accordingly, it is an object of the present invention to provide a tactile feedback apparatus for a remote control robot which employs an electromagnetic attraction for a sophisticated task performance, thereby being linearly controlled by electrical current, densely arraying small size tactile feedback devices, and significantly decreasing noise, operator's weariness and operational errors.

To achieve the above-described object, a tactile feedback apparatus using an electromagnetic attraction for a remote control robot according to the present invention includes a contact target analyzer receiving an tactile data signal, analyzing a contact target and outputting a command signal, a tactile feedback device driving circuit converting the command signal outputted from the contact target analyzer to a current signal, and a tactile feedback device converting an attraction between a fixed plunger and a movable plunger in accordance with the current signal outputted from the tactile feedback device driving circuit, and controlling a tactility in accordance therewith.

Further, to achieve the above-described object, in a tactile feedback apparatus using an electromagnetic attraction for a remote control robot according to the present invention, a magnetic field induced in accordance with a current supply from a tactile feedback device driving circuit to a wound coil passes through a fixed plunger and flows along an outer periphery of a shell and then comes to a movable plunger spaced by a certain distance from the fixed plunger, and a lower end of the fixed plunger and an upper end of the movable plunger differ in polarity from each other so that the movable plunger is attracted and abutted onto the fixed plunger, and at this time a pin attached to the movable plunger moves through the fixed plunger, thereby delivering a tactility to a skin positioned adjacent to the pin.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

In order to overcome the disadvantages of the conventional tactile feedback apparatus employing techniques such as air pressure, a shape memory alloy and vibration, the tactile feedback apparatus for a remote control robot system according to the present invention utilizes a mechanism different from that of the conventional art. That is, an electromagnetic attraction is used to generate a tactile force for a continuous control thereof depending upon the variation in an electrical current being applied to a coil. The employed electromagnet is surrounded by a material having a high permeability so as to prevent an interruption of magnetic field between devices, thereby obtaining a densely populated and a high performance array. A linear control becomes facilitated by slanting each side of a slidingly inserted movable plunger and a fixed plunger which abuts to the movable plunger, whereby the devices become minimized in weight and in size and accordingly the weariness caused by the weight during the attachment becomes decreased, as well as decreasing an interference during its operation. Further, considering characteristics of a human tactile recognition, the present invention enables an array unit feedback depending on contact types, thereby feeling complicated tactilities such as a contact sensibility and a slippage of a material.

With reference to the accompanying drawings, the tactile feedback apparatus for a remote control robot system according to the present invention will now be described.

Figure 1:
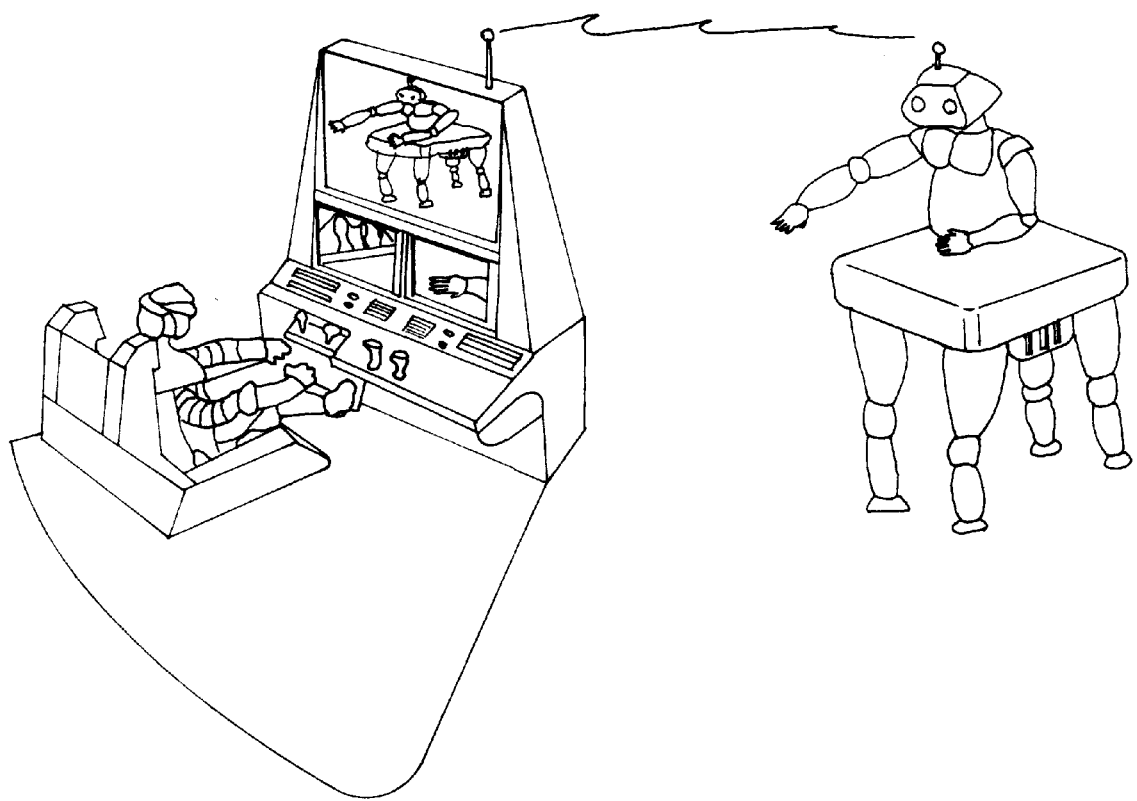
FIG. 1 is a schematic perspective view of a general remote control robot system.
Figure 2:
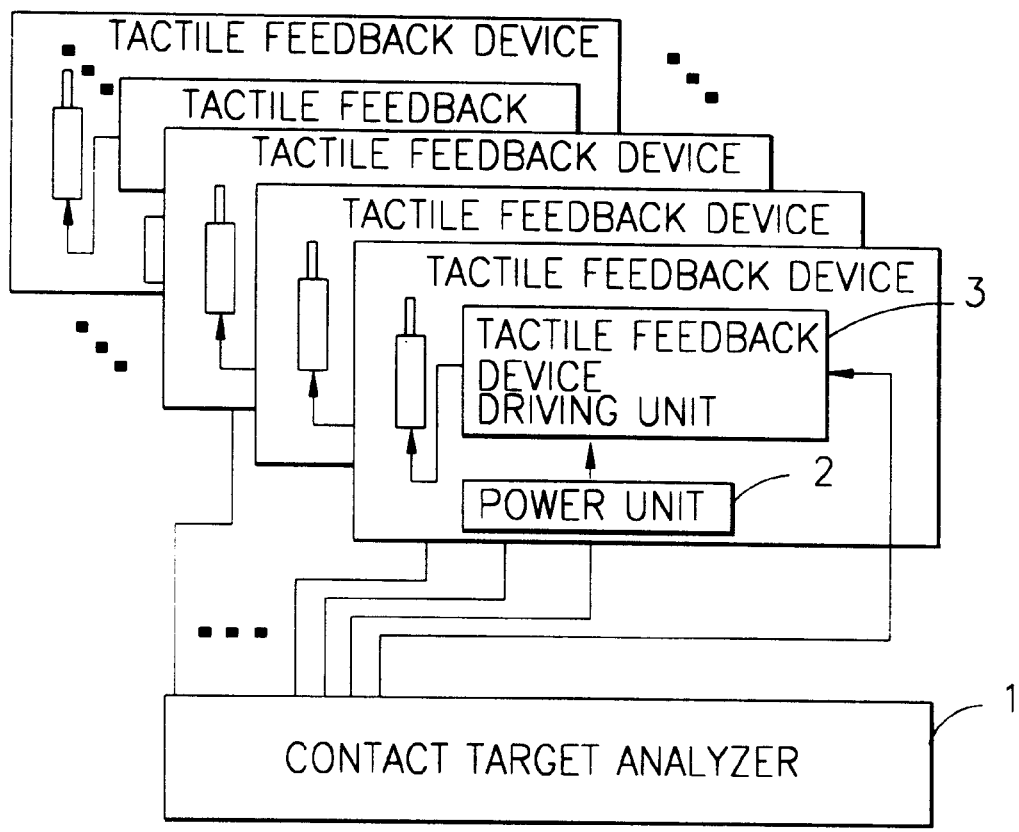
FIG. 2 is a block diagram of a tactile feedback apparatus employing an electromagnetic attraction according to the present invention.
Figure 3:
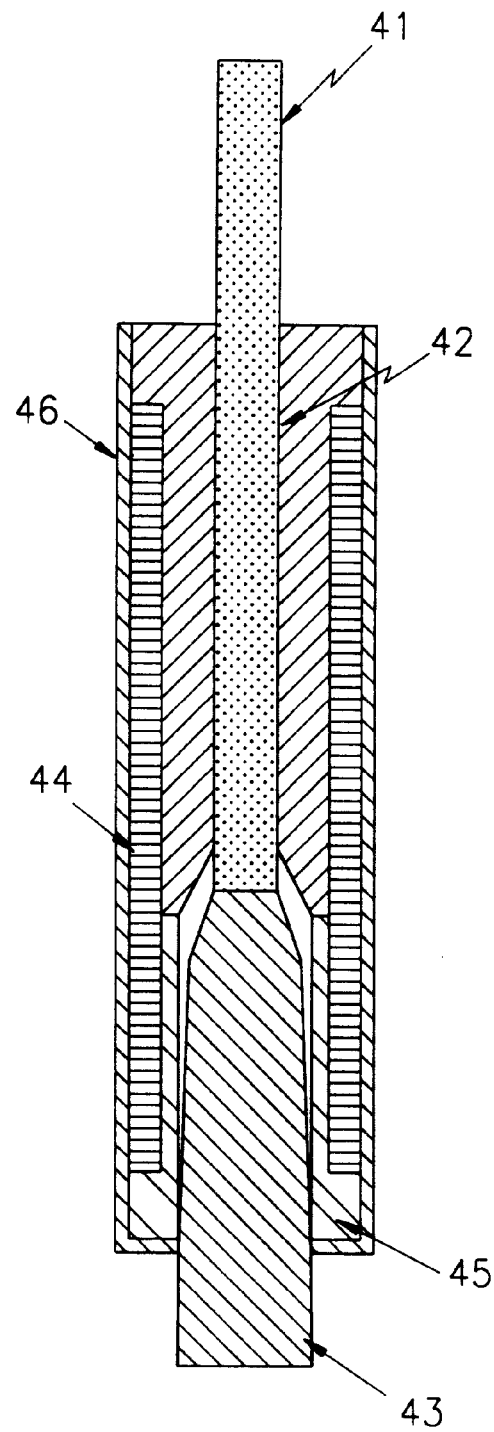
FIG. 3 is an exemplary view of a tactile feedback device in the diagram of FIG. 2.

FIG. 2 is a composite view of the tactile feedback apparatus using an electromagnetic attraction according to the present invention, and FIG. 3 is an exemplary view of a tactile feedback device in FIG. 2. As shown therein, the tactile feedback apparatus according to the present invention includes: a contact target analyzer 1 receiving an tactile data signal, analyzing the contact target and outputting a command signal; a power supply unit 2 supplying electrical power; a tactile feedback device driving circuit 3 receiving a power current from the power supply unit 2, and the command signal outputted from the contact target analyzer; and a tactile feedback device 4 converting an attraction between a fixed plunger 42 and a movable plunger 43, and transferring the tactility through a pin 41 to a system operator.

As shown in FIG. 3 illustrating the tactile feedback device 4, a bobbin 45 for guiding the movement of the movable plunger 43 is inserted into a cylindrical tube type fixed plunger 42 through which the pin 41 mocylindrical ves. A coil 44 is densely wound on the fixed plunger 42 and the bobbin 45, and a shell 46 encloses the wound coil 44. The movable plunger 43 and the pin 41 attached thereto are formed to move along the bobbin 45.

The operation of the thusly constituted tactile feedback apparatus according to the present invention will now be described.

When current is applied from the tactile feedback device driving circuit 3 to the coil 44, the accordingly induced magnetic field passes through the fixed plunger 42 and flows along the outer periphery of the shell 46 and then comes back to the movable plunger 43 spaced by a certain distance from the fixed plunger 42. Accordingly, the lower end of the fixed plunger 42 and the upper end of the movable plunger 43 differ in magnetic polarity from each other so that the movable plunger 43 is attracted and abutted onto the fixed plunger 42. At this time, the pin 41 attached to the movable plunger 43 moves up through the fixed plunger 42, stroking or pushing upon the operator's skin positioned at the tip of the pin 41.

Figure 4:
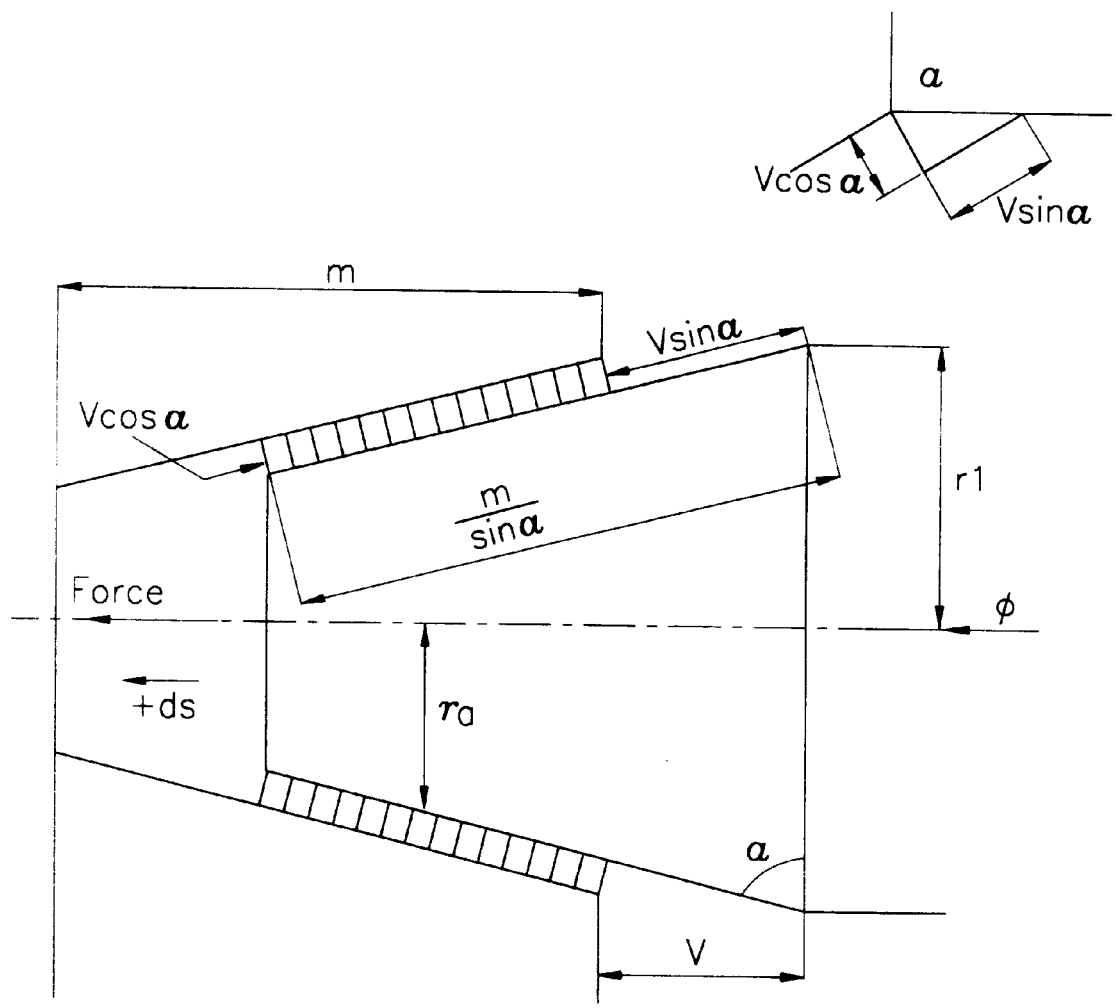
FIG. 4 is a model view of an air-gap ambience for inducing force of the tactile feedback device in the view of FIG. 3.

With reference to FIG. 4 illustrating a model view of the tactile feedback devices around air-gap vicinities, an attraction between the fixed plunger 42 and the movable plunger 43 will be now described.

If a fringing flux is ignored, an air-gap permeance will be incorporated by equation 1:

$$P_a = \frac{\mu S}{l} = \frac{2\pi\mu r_a}{V\cos\alpha}\left(\frac{m}{\sin\alpha} - V\sin\alpha\right) \quad (1)$$

wherein, S denotes a planar area of the parallel facing planes, I denotes a distance apart, $\mu$ denotes an air permeability, $r_a$ denotes an average radius of a truncated cone, V denotes a displacement of movable plunger, $\alpha$ denotes an angle between slope and vertical plane of a movable plunger and m denotes a thickness of a fixed plunger. When equation 1 is differentiated over the distance moved ds, there is obtained equation 2:

$$\frac{dP_a}{ds} = -\frac{2\pi\mu m r_a}{V^2 \sin\alpha\cos\alpha}\frac{dV}{ds} \quad (2)$$

wherein, dV=−ds. If equation 2 is substituted into a general formula for magnetomotive force, there is obtained equation 3:

$$Force = \frac{1}{2}F_a^2\frac{dP_a}{dS} = \frac{\pi\mu m r_a F_a^2}{V^2 \sin\alpha\cos\alpha} \quad (3)$$

wherein, $F_a$ is an magnetomotive force between air gaps, measured in ampere-turns. The force may be expressed as an equation including a magnetic flux density. The magnetic flux Ø of the movable plunger is as formulated in expression 4:

$$\phi = F_a P_a = \frac{2\pi\mu r_a F_a}{V\cos\alpha}\left(\frac{m}{\sin\alpha} - V\sin\alpha\right) \quad (4)$$

Using equation 4, an magnetic flux density $B_p$ diatributed over the entire plungers may be calculated as incorporated equation 5:

$$B_p = \frac{\phi}{S} = \frac{\phi}{\pi r_1^2} = \frac{2\mu r_a F_a}{V r_1^2 \cos\alpha}\left(\frac{m}{\sin\alpha} - V\sin\alpha\right) \quad (5)$$

By replacing $F_a$ in equation 3 with the $F_a$ obtained from equation 5, equation 6 is obtained that expresses the force as an equation including a magnetic flux density:(6)

$$Force = \frac{B_p^2 r_1^4 m \cos\alpha}{4\mu^2 V^2 r_a \sin\alpha \left(\frac{m}{V\sin\alpha} - \sin\alpha\right)^2} \quad (6)$$

As seen from equation 6, the force depends on a variety of factors acting in composite manner.

Design measurements for respective parts of the present invention take equation 6 as basic variables, and maximum tactilities generated are considered as object functions in their optimal designs, so that an optimal design algorithm is introduced, and effects resulting from the measurements of the respective parts were analyzed using FEM(Finite Element Method), whereby a model that generates a maximum tactility within the process limitation is selected for its design and fabrication.

Figure 5:
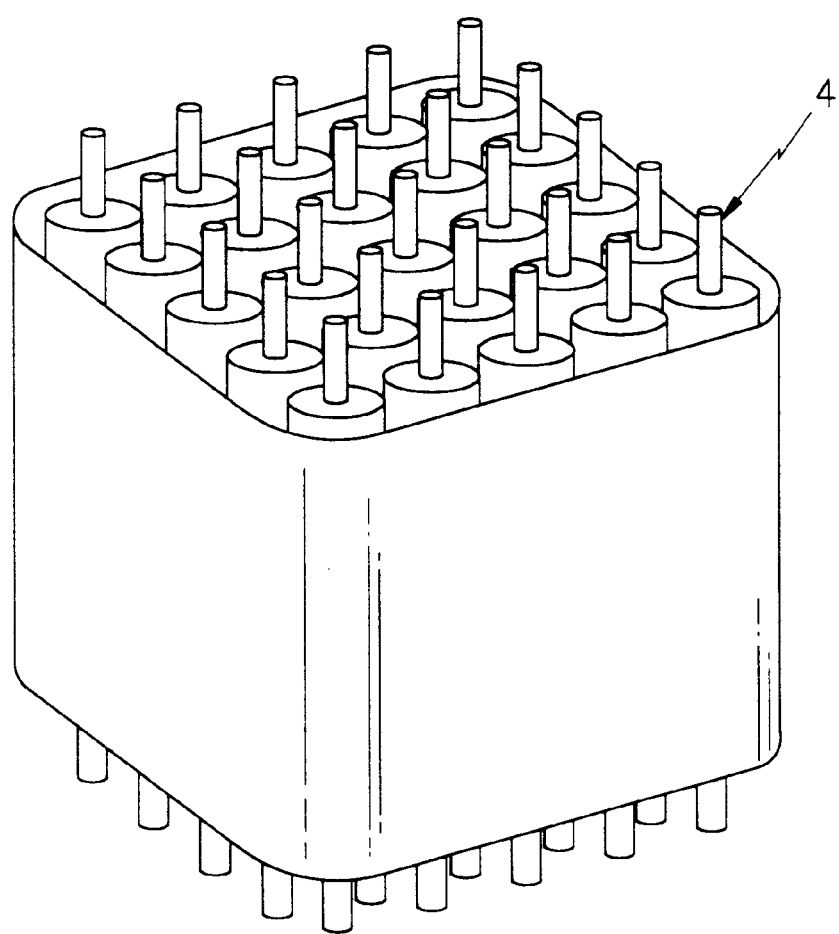
FIG. 5 is a perspective view of a 5×5 array tactile feedback device in the view of FIG. 3.

FIG. 5 is a perspective view illustrating a 5×5 array of tactile feedback devices in the same kinds as in FIG. 3.

The contact target analyzer 1 in FIG. 2 receives tactile signals from a gripper array unit. Considering the skin characteristics of human operator's for recognizing tactile sensations, an appropriate command signal is applied to each of the tactile feedback devices 4 in the 5×5 array. The command signals received from the tactile feedback device driving circuit 3 are converted into driving currents and appropriately amplified so as to drive the 5×5 array of tactile feedback devices 4, thereby enabling an array unit tactile feedback. At this time, the tactile feedback device driving circuit 3 receives supply voltage from the power supply unit 2.

Figure 6:
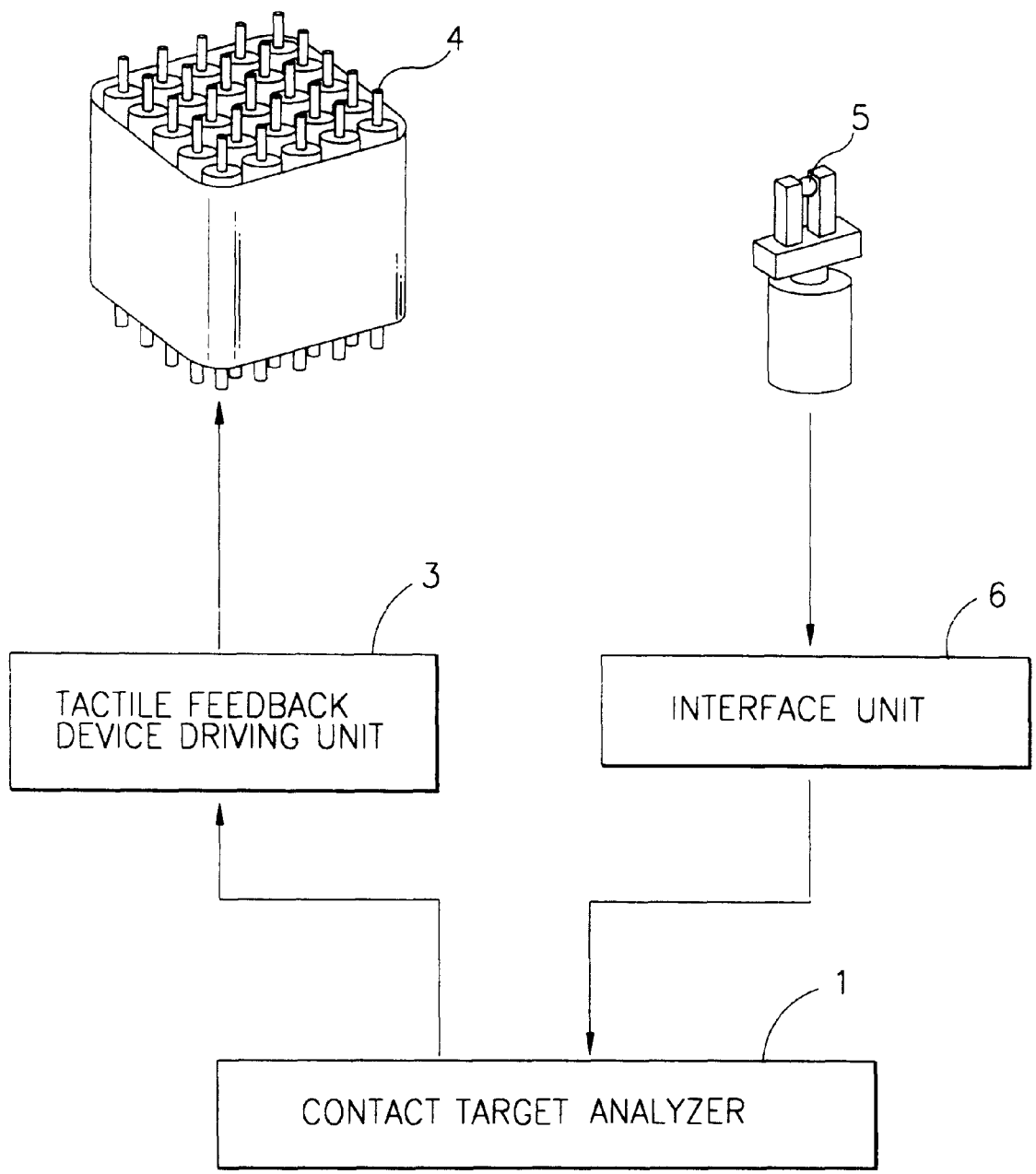
FIG. 6 is a composition view of a tactile feedback system employing the tactile feedback apparatus according to the present invention.

FIG. 6 is a composition view of a tactile feedback system employing the tactile feedback apparatus according to the present invention. As shown therein, the tactile feedback apparatus includes: a tactile sensor 5 mounted inside a gripper of a robot, and measuring a contact force that occurs between the gripper and a target that is contacted by the gripper during the robot's operation; an interface unit 6 for amplifying and outputting signals sensed in the tactile sensor 5; the contact target analyzer 1 receiving and analyzing the signals outputted from the interface unit 6, converting the resultant signals into a type suitable as an output signal to the array type tactile feedback device 4 by determining what type the contact target is, and outputting command signals to the respective tactile feedback devices 4; the tactile feedback device driving circuit 3 converting and amplifying the command signals received from the contact target analyzer 1 into current signals appropriate for driving the devices 4; and the tactile feedback devices 4 similating the robot gripper's tactility to the operator in accordance with the driving currents provided thereto through the tactile feedback device driving circuit 3.

Figure 7:
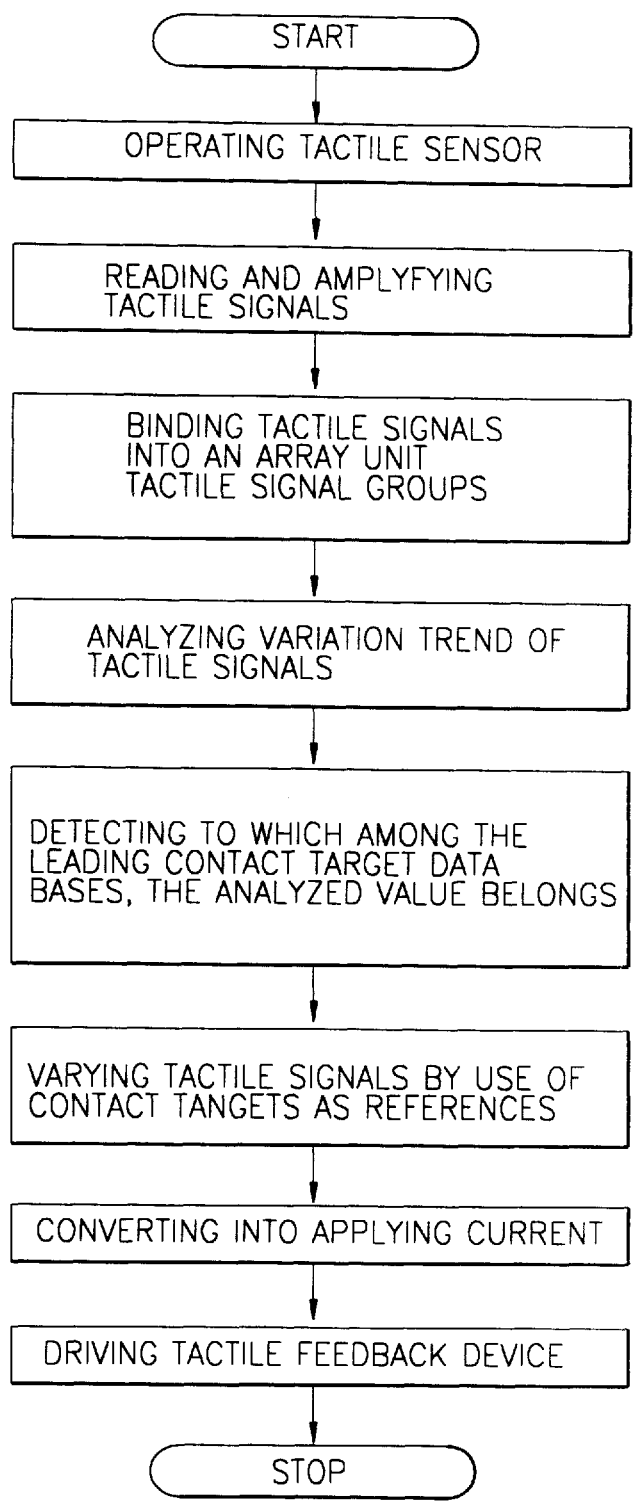
FIG. 7 is a flow chart showing the tactile feedback steps in FIG. 6.

With reference to FIG. 7 illustrating operational steps wherein the pin is fed back, the respective assignments and operation of the system components in FIG. 6 will now be explained.

The tactile sensor 5 has a 2 mm spatial resolution as its limit value with regard to the skin. Here, the tactile sensor 5 having a tactile array of 16×16 in an area of 15×15 mm² is employed, and when the robot gripper comes into contact with an operation target, the then tactile data are read from respective tactile sensing points in the tactile array at a fast frequency, and signals proportional to the vertical loadings thereon are outputted. The outputted signals are directly applied to the contact target analyzer 1 which in turn binds the received signals into an array unit tactile signal group based upon a sampling time reference. Then, using the tactile signal group as a unit, the variation trend of a certain number of sets is analyzed. At this time, considering the capability of the tactile feedback device 4, it is detected to which among the leading contact target data bases obtained by experiments or theoretically, the analyzed value belongs. Then, on the basis of the leading contact targets, an appropriate variation is allowed in accordance with a force magnitude and distribution of the average tactile signal group, thereby applying corresponding command signals to the tactile feedback device driving circuit 3. Then, the tactile feedback device driving circuit 3 converts the command signals given in the form of voltages into current signals, and amplifies the converted signals, thereby driving the tactile feedback devices 4. The tactile feedback devices 4 each alter the magnitude of a magnetic field in accordance with a given current so as to control the attraction force of the movable plunger 43. At this time, the movable plunger 43 pushes or strokes the pin 41 toward the operator's skin, thereby generating the sensations of tactility.

As described above, the tactile feedback apparatus for a remote control robot system according to the present invention enables a successive tactile control by use of an electromagnetic attraction, and an array type fabrication. Also, by optimizing the design to broaden the tactile feedback area, there may be provided a small tactile feedback device for representing a relatively improved tactility per unit, and by aligning the tactile feedback devices in a 5×5 array mode on a skin of 15×15 mm², it becomes possible to determine a contact location more precisely.

Further, an advanced tactile feedback apparatus is provided to feed back complicated tactile data such as a slippage, so that the tactile data detected by the robot gripper positioned at a distance from the operator can be received by the operator on a real time basis through the tactile feedback apparatus mounted at a glove tip, thereby facilitating robot task performances faster than those which used to be carried out on a non-real time basis as well as broadening workable fields, together with the subsequent precision and sophistication thereof.

What is claimed is:

1. A tactile feedback apparatus using an electromagnetic attraction for a remote control robot, comprising:

a contact target analyzer receiving a tactile data signal, analyzing a contact target and outputting a command signal;

a tactile feedback device driving circuit converting the command signal outputted from the contact target analyzer to a current signal; and a tactile feedback device converting an attraction between a fixed plunger and a moveable plunger in accordance with the current signal outputted from the tactile feedback device driving circuit, and controlling a tactility in accordance therewith;

wherein in said tactile feedback device, a bobbin for guiding a movement of said movable plunger that is in contact with a pin is inserted into said fixed plunger formed in a cylindrical tube type through which said pin moves, and a coil is densely wound on said fixed plunger and bobbin, and then an outer periphery of said wound coil is enclosed by a shell; and wherein in said tactile feedback device, a bobbin is shortened to guide a moving portion of said movable plunger and inserted into said fixed plunger.

2. The tactile feedback apparatus of claim 1, wherein said tactile feedback device is aligned in an array type.

3. The tactile feedback apparatus of claim 1, further comprising a tactile sensor measuring a tactility that occurs between a gripper and a task target that is to be in contact with said gripper during a robot task performance, and an interface unit amplifying a measurement signal of said tactile sensor and transmitting the measurement signal to said contact target analyzer.

4. A tactile feedback apparatus using an electromagnetic attraction for a remote control robot, comprising:

a contact target analyzer receiving a tactile data signal, analyzing a contact target and outputting a command signal;

a tactile feedback device driving circuit converting the command signal outputted from the contact target analyzer to a current signal; and a tactile feedback device converting an attraction between a fixed plunger and a moveable plunger in accordance with the current signal outputted from the tactile feedback device driving circuit, and controlling a tactility in accordance therewith wherein said contact target analyzer binds output signals from respective measurement nodes in a tactile sensor into array unit signal groups based upon a sampling time reference, analyzes the variation trend of a certain number of sets using the tactile signal group as a unit, detects to which among the leading contact target data bases obtained experimentally and theoretically the analyzed value belongs, and applies a corresponding command signal to said tactile feedback device driving circuit by an appropriate variation thereof in accordance with a force magnitude and distribution of average tactile signal groups by use of the provided contact targets as references.

5. A tactile feedback apparatus using an electromagnetic attraction for a remote control robot, wherein a magnetic field induced in accordance with a current supply from a tactile feedback device driving circuit to a wound coil passes through a fixed plunger and flows along an outer periphery of a shell and then comes to a movable plunger spaced by a certain distance from said fixed plunger, and a lower end of said fixed plunger and an upper end of said movable plunger differ in polarity from each other so that said movable plunger is attracted and abutted onto said fixed plunger, and at this time a pin attached to said movable plunger moves through said fixed plunger, thereby delivering a tactility to a skin positioned adjacent to said pin;

wherein respective contact surfaces of said movable plunger and said fixed plunger are slanted to increase a movement displacement.

* * * * *